(12) United States Patent
Suda

(10) Patent No.: US 9,448,691 B2
(45) Date of Patent: Sep. 20, 2016

(54) DEVICE, METHOD, AND STORAGE MEDIUM STORING PROGRAM

(71) Applicant: KYOCERA CORPORATION, Kyoto-shi, Kyoto (JP)

(72) Inventor: Kazuyoshi Suda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 340 days.

(21) Appl. No.: 13/672,883

(22) Filed: Nov. 9, 2012

(65) Prior Publication Data

US 2013/0125056 A1     May 16, 2013

(30) Foreign Application Priority Data

Nov. 10, 2011   (JP) .................................. 2011-246700

(51) Int. Cl.
   *G06F 3/048* (2013.01)
   *G06F 3/0481* (2013.01)
   *G06F 3/0488* (2013.01)
   *G06F 3/0482* (2013.01)

(52) U.S. Cl.
   CPC .......... *G06F 3/04817* (2013.01); *G06F 3/0482* (2013.01); *G06F 3/0488* (2013.01); *G06F 2203/04803* (2013.01)

(58) Field of Classification Search
   CPC ........... G06F 3/01–3/04886; G06F 8/60–8/62
   USPC ....................................................... 715/760
   See application file for complete search history.

(56) References Cited

U.S. PATENT DOCUMENTS

| 5,564,004 | A | 10/1996 | Grossman et al. | |
|---|---|---|---|---|
| 5,740,390 | A | 4/1998 | Pickover et al. | |
| 5,745,715 | A | 4/1998 | Pickover et al. | |
| 5,760,774 | A | 6/1998 | Grossman et al. | |
| 5,852,440 | A | 12/1998 | Grossman et al. | |
| 8,230,355 | B1* | 7/2012 | Bauermeister | G06F 3/0481 715/765 |
| 2003/0081011 | A1* | 5/2003 | Sheldon et al. | 345/838 |
| 2003/0084087 | A1* | 5/2003 | Berry | G06F 1/3203 718/102 |
| 2003/0217359 | A1* | 11/2003 | Ohi | G06F 8/60 717/174 |
| 2004/0267600 | A1* | 12/2004 | Horvitz | G06F 17/30873 705/7.31 |
| 2006/0095864 | A1* | 5/2006 | Mock | G06F 1/3203 715/810 |
| 2007/0011622 | A1* | 1/2007 | Chae et al. | 715/764 |
| 2007/0083827 | A1* | 4/2007 | Scott et al. | 715/811 |
| 2007/0209022 | A1* | 9/2007 | Gourdol et al. | 715/815 |
| 2008/0052642 | A1* | 2/2008 | Champion et al. | 715/862 |

(Continued)

FOREIGN PATENT DOCUMENTS

| CN | 103064716 A | * | 4/2013 |
|---|---|---|---|
| JP | 7-13732 A | | 1/1995 |

(Continued)

OTHER PUBLICATIONS

Machine translation of CN103064716, retrieved from http://worldwide.espacenet.com/ (Jun. 2, 2016).*

(Continued)

*Primary Examiner* — Andrea Long
*Assistant Examiner* — Linda Huynh
(74) *Attorney, Agent, or Firm* — Hauptman Ham, LLP

(57) ABSTRACT

According to an aspect, a device includes a display and a controller. The display displays an icon corresponding to an application. The controller changes a display mode of the icon according to a use status of the application corresponding thereto.

16 Claims, 15 Drawing Sheets

(56) References Cited

U.S. PATENT DOCUMENTS

| | | |
|---|---|---|
| 2008/0074384 A1* | 3/2008 | Orr et al. .................... 345/156 |
| 2008/0165160 A1 | 7/2008 | Kocienda et al. |
| 2008/0201724 A1* | 8/2008 | Endrikhovski et al. ...... 719/318 |
| 2008/0307333 A1* | 12/2008 | McInerney et al. .......... 715/764 |
| 2008/0313567 A1* | 12/2008 | Sabin et al. ................... 715/835 |
| 2010/0131904 A1* | 5/2010 | Fong et al. .................... 715/863 |
| 2011/0271182 A1* | 11/2011 | Tsai ..................... G06F 3/0483 715/702 |
| 2012/0030623 A1* | 2/2012 | Hoellwarth ................... 715/811 |
| 2012/0084692 A1* | 4/2012 | Bae .................... G06F 3/04817 715/769 |
| 2012/0117127 A1* | 5/2012 | MacDonald ................. 707/822 |
| 2012/0140255 A1* | 6/2012 | Tanaka .................... G06F 9/445 358/1.13 |
| 2012/0297304 A1* | 11/2012 | Maxwell ........... H04M 1/72569 715/728 |
| 2013/0014040 A1* | 1/2013 | Jagannathan et al. ........ 715/765 |

FOREIGN PATENT DOCUMENTS

| | | |
|---|---|---|
| JP | 7-36656 A | 2/1995 |
| JP | 7-281864 A | 10/1995 |
| JP | 2003-151243 A | 5/2003 |
| JP | 2004-252544 A | 9/2004 |
| WO | 2008086302 A1 | 7/2008 |

OTHER PUBLICATIONS

Office Action mailed Aug. 4, 2015, corresponding to Japanese patent application No. 2011-246700, for which an explanation of relevance is attached.

Office Action mailed Mar. 10, 2015, corresponding to Japanese patent application No. 2011-246700, for which an explanation of relevance is attached.

* cited by examiner

FIG.6

| SCREEN | ROW | COLUMN | IMAGE | NAME | INSTALLATION DATE/TIME | USAGE | LAST USE DATE/TIME |
|---|---|---|---|---|---|---|---|
| ... | ... | ... | ... | ... | ... | ... | ... |
| 2 | 1 | 1 | brower.png | Browser | 2011/3/21 16:42 | 5 | 2011/4/1 20:18 |
| ... | ... | ... | ... | ... | ... | ... | ... |
| 2 | 2 | 2 | mail.png | Mail | 2011/3/21 16:58 | 11 | 2011/8/36 10:25 |
| ... | ... | ... | ... | ... | ... | ... | ... |

DEVICE, METHOD, AND STORAGE MEDIUM STORING PROGRAM

CROSS-REFERENCE TO RELATED APPLICATIONS

This application claims priority from Japanese Application No. 2011-246700, filed on Nov. 10, 2011, the content of which is incorporated by reference herein in its entirety.

BACKGROUND

1. Technical Field

The present application relates to a device, a method, and a storage medium storing therein a program. More particularly, the present application relates to a device including a display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen display. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Many of the touch screen devices display a screen called "home screen" on a display. Arranged on the home screen are objects called "icons". When detecting a gesture performed for an icon, the touch screen device executes an application corresponding to the icon for which the gesture is performed.

The more the number of applications installed into the touch screen device increases, the more the number of icons arranged on the home screen increases. If many icons are arranged on the home screen, an icon corresponding to an application desired to be executed may be difficult to find out. Such a problem may occur in not only the touch screen devices but also various devices capable of arranging a plurality of icons on the display.

For the foregoing reasons, there is a need for a device, a method, and a program capable of improving the operability of icons.

SUMMARY

According to an aspect, a device includes a display and a controller. The display displays an icon corresponding to an application. The controller changes a display mode of the icon according to a use status of the application corresponding thereto.

According to another aspect, a method is for controlling a device having a display. The method includes: displaying an icon corresponding to an application on the display; and changing a display mode of the icon according to a use status of the application corresponding thereto.

According to another aspect, a non-transitory storage medium stores a program. When executed by a device having a display, the program causes the device to execute: displaying an icon corresponding to an application on the display; and changing a display mode of the icon according to a use status of the application corresponding thereto.

BRIEF DESCRIPTION OF THE DRAWINGS

FIG. 6 is a diagram illustrating an example of use status data;

DETAILED DESCRIPTION

Exemplary embodiments of the present invention will be explained in detail below with reference to the accompanying drawings. A smartphone will be explained below as an example of a device provided with a display.

Figure 1:
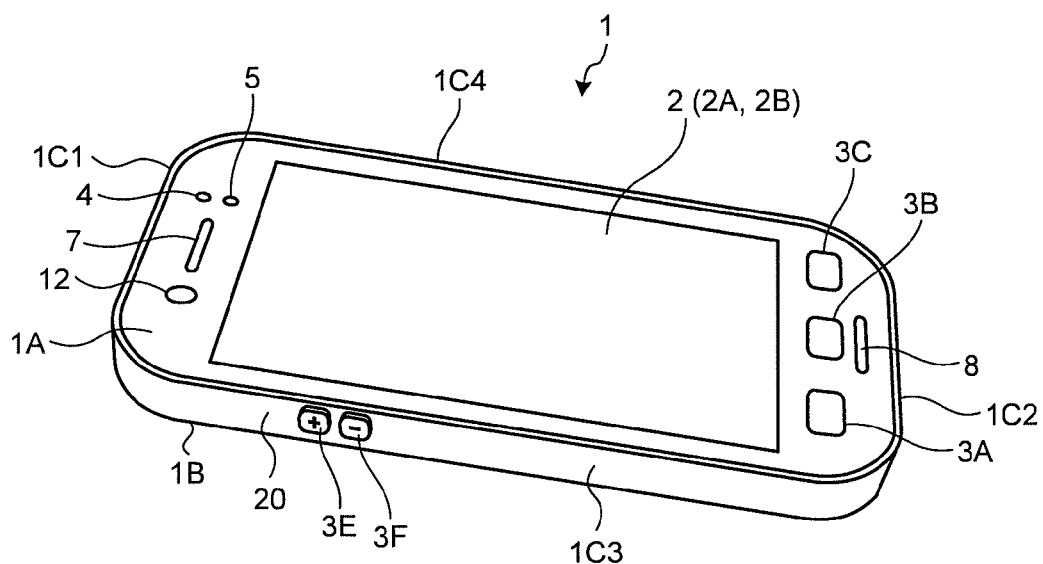
FIG. 1 is a perspective view of a smartphone according to an embodiment.
Figure 2:
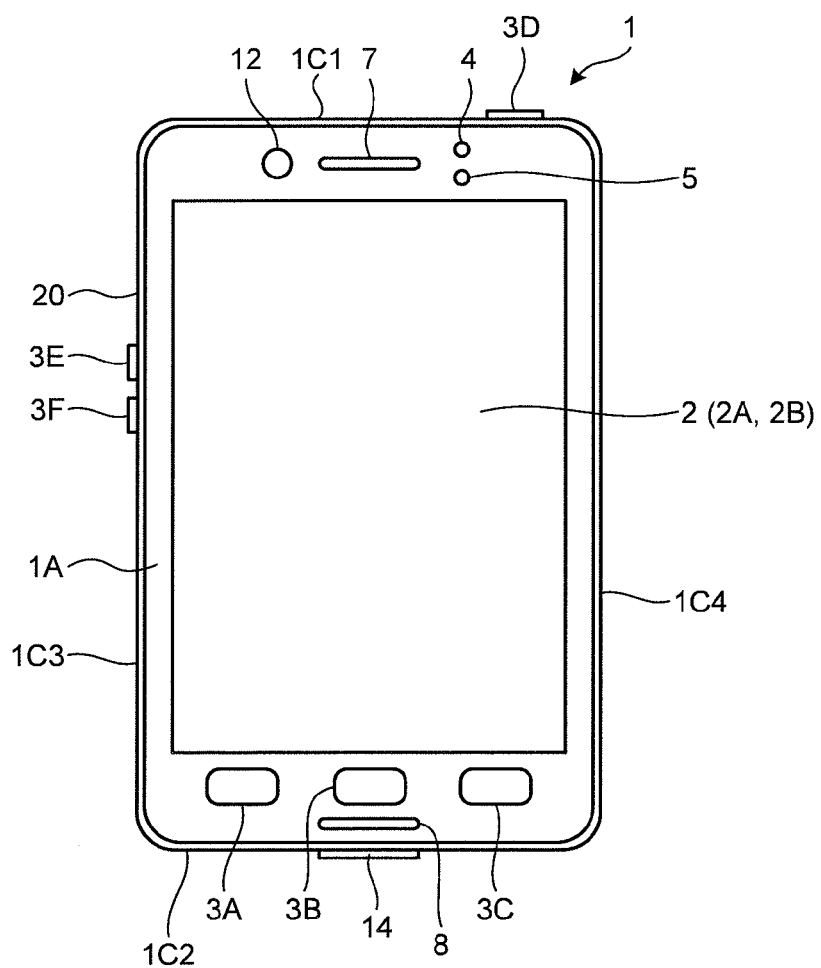
FIG. 2 is a front view of the smartphone.
Figure 3:
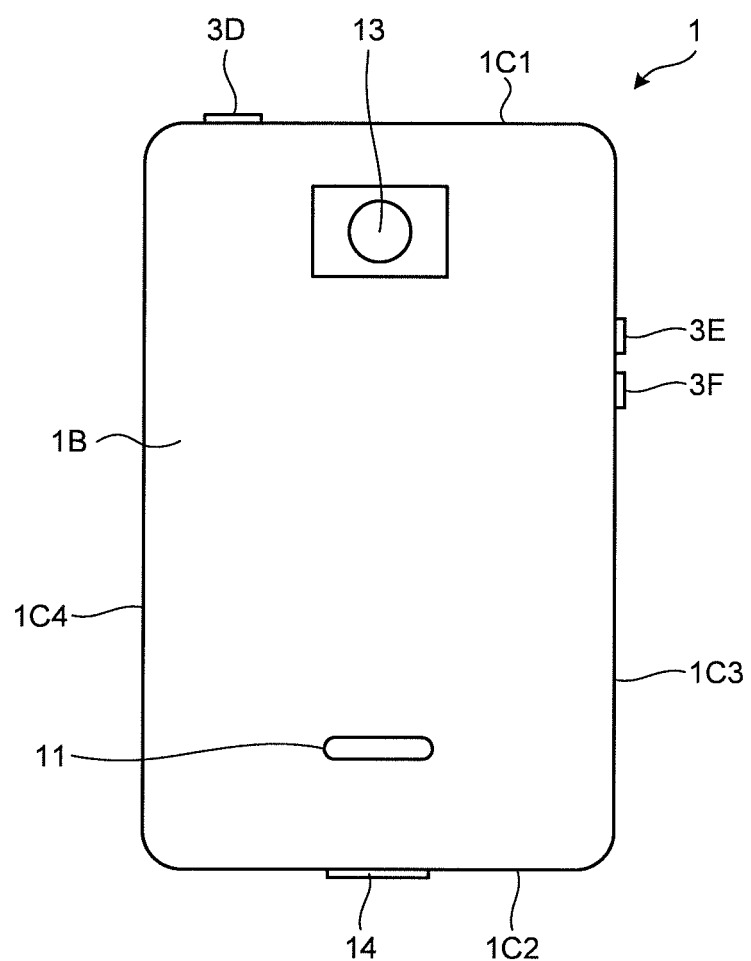
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 10. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (OELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
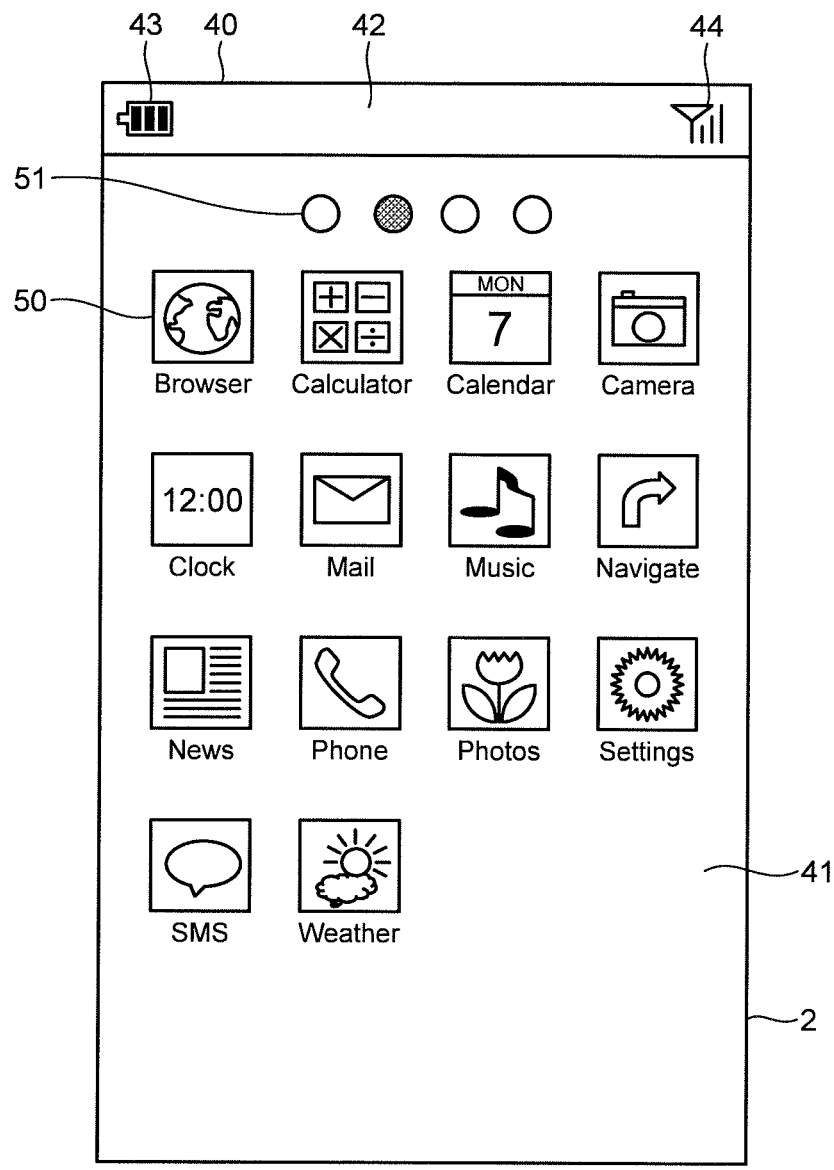
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can change the number of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
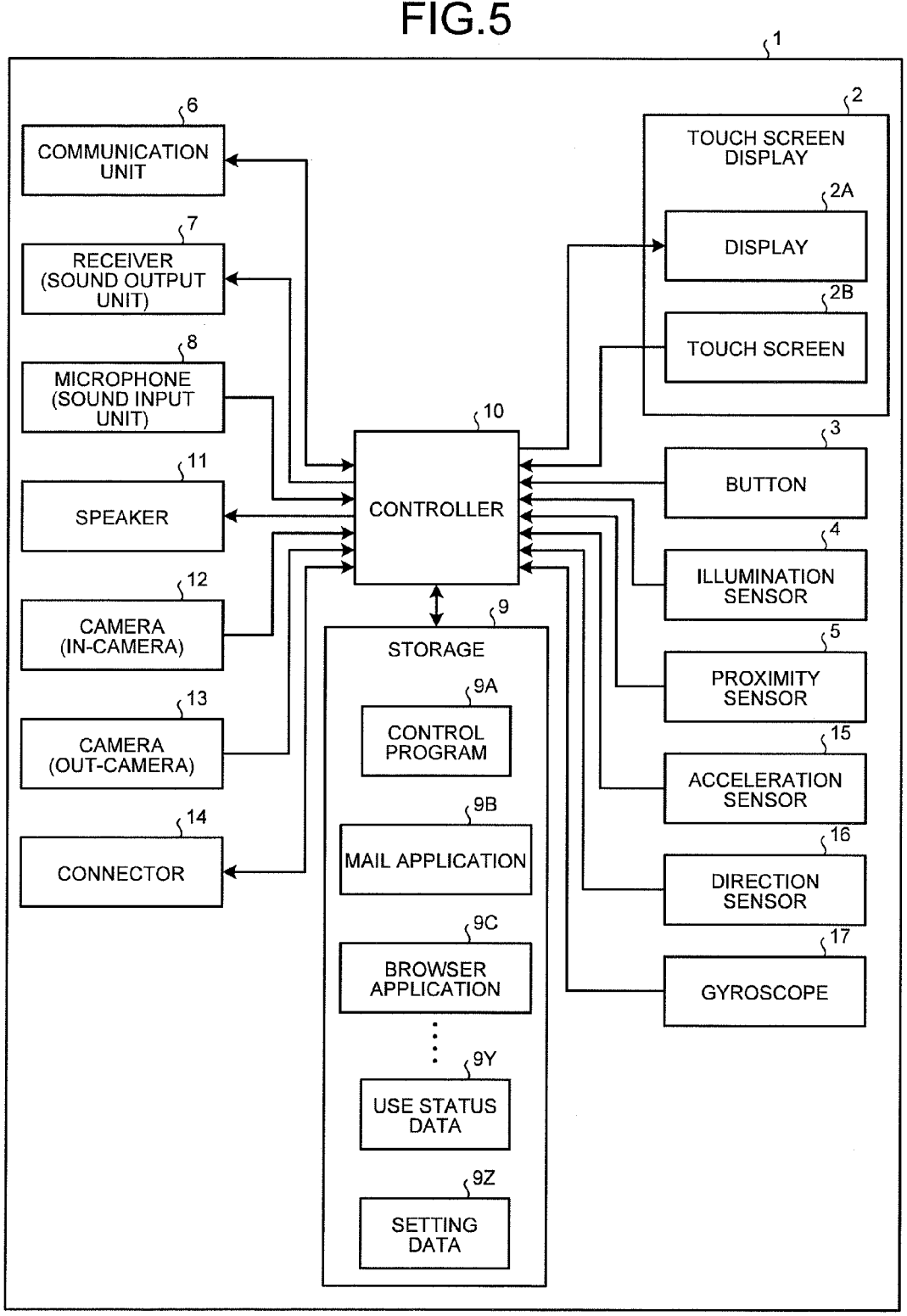
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

The programs stored in the storage 9 include applications executed in the foreground or in the background and a control program for assisting operations of the applications. The application causes, for example, a predetermined screen to be displayed on the display 2A, and the controller to perform a process according to a gesture detected through the touch screen 23. The control program is, for example, an OS. The application and the control program may be installed in the storage 9 through communication by the communication unit 6 or through a non-transitory storage medium.

The storage 9 stores therein, for example, a control program 9A, a mail application 9B, a browser application 9C, use status data 9Y, and setting data 9Z. The mail application 9B provides an e-mail function. The e-mail function allows composition, transmission, reception, and display of e-mail, and the like. The browser application 9C provides a WEB browsing function. The WEB browsing function allows display of WEB pages, and edit of a book mark, and the like. The use status data 9Y contains information related to use statuses of applications installed into the smartphone 1. The setting data 9Z contains information related to various settings on the operations of the smartphone 1.

FIG. 6 is a diagram illustrating an example of the use status data 9Y. As illustrated in FIG. 6, the use status data 9Y includes items such as Screen, Row, Column, Image, Name, Installation Date/Time, Usage, and Last Use Date/Time, and holds data for each application installed into the smartphone 1. The value of the item of Screen indicates a home screen in which icons corresponding to applications are arranged. The values of Row and Column indicate positions at which an icon is arranged on the home screen. The values of Image and Name indicate an image and a character string displayed as an icon. The value of Installation Date/Time indicates a date and time when an application is installed into the smartphone 1. The value of Usage indicates the number of times an application is used. The value of Usage may be the total number of times an application is used after its installation, or may be the number of times an application is used after a certain time point. The value of Last Use Date/Time indicates a date and time when an application is last used. The values of Usage and Last Use Date/Time are updated when a corresponding application is executed.

The control program 9A provides a function related to various controls for operating the smartphone 1. The control program 9A controls, for example, the communication unit 6, the receiver 7, and the microphone 8 to make a phone call. The function provided by the control program 9A includes functions for performing various controls such as changing a display mode of icons to be arranged on the home screen according to use statuses of applications. The functions provided by the control program 9A can be used in combination with a function provided by the other program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to perform various controls, such as a control for changing information displayed on the display 2A in accordance with the gesture detected through the touch screen 2B.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Examples of the controls based on the function provided by the control program 9A will be explained below with reference to FIG. 7 and FIG. 8. The function provided by the control program 9A includes a function for changing a display mode of an icon according to the use status of a corresponding application. Specifically, the smartphone 1 changes a display mode (or an appearance) of the icon as the display mode changes. More specifically, the smartphone 1 displays any icon corresponding to an application not much used so as to be made less conspicuous based on the function provided by the control program 9A. The function provided by the control program 9A further includes a function for saving an icon corresponding to an application not much used and a function for performing batch uninstallation of applications corresponding to saved icons.

Figure 7:
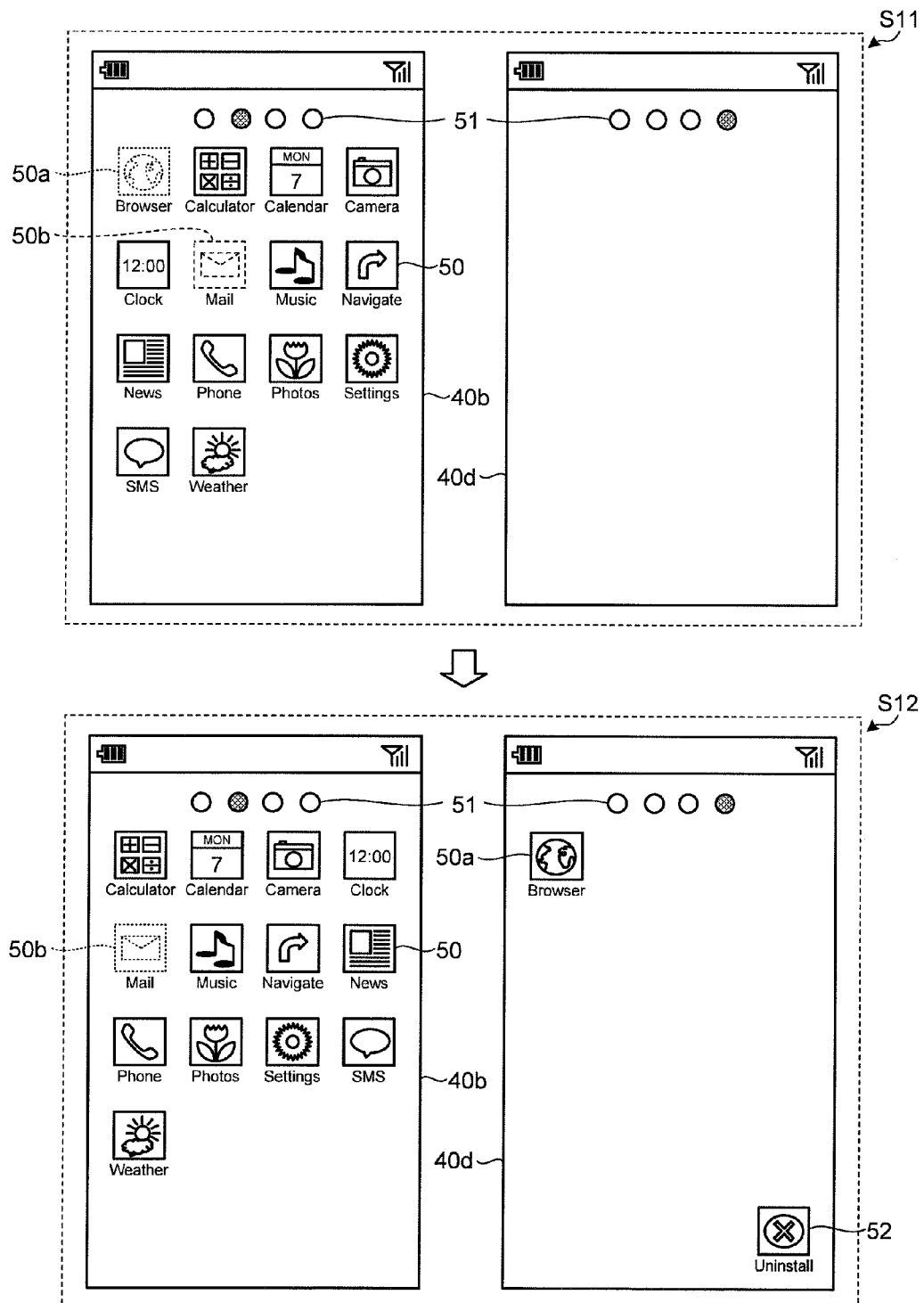
FIG. 7 is a diagram illustrating an example of changing a display mode of an icon according to the use status of an application.

FIG. 7 depicts a change of icons 50 arranged in a home screen 40b on the second from the left and in a home screen 40d on the far right. At Step S11, the smartphone 1 increases the transparency of an icon 50b corresponding to the mail application 9B more than that of other icons 50, and much more increases the transparency of an icon 50a corresponding to the browser application 9C. This indicates that the mail application 9B is used less frequently than applications corresponding to other icons 50 and the browser application 9C is used much less frequently than the mail application 9B.

Such control of the display mode makes it easier for the user to find an icon 50 corresponding to a frequently used application, thus improving the user's operability. The smartphone 1 determines whether an application is used frequently based on at least one of, for example, use frequency and unused period. The use frequency is the number of times an application is executed in a given period. The use frequency can be calculated based on the value of Usage in the use status data 9Y. The unused period is an elapsed time since the last use of an application. The unused period can be calculated based on the value of Last Use Date/Time in the use status data 9Y.

The home screen 40d is used as an area for saving an icon 50 corresponding to an application which is hardly used. For example, when the use frequency of an application becomes less than a second threshold, the smartphone 1 increases the transparency of a corresponding icon 50 according to the use frequency, and when the use frequency of an application becomes less than a first threshold, the smartphone 1 moves a corresponding icon 50 to the home screen 40d. In this case, the second threshold is set to be greater than the first threshold. Alternatively, when the unused period of an application is longer than a second threshold, the smartphone 1 increases the transparency of a corresponding icon 50 according to the unused period, and when the unused period of an application becomes longer than a first threshold, the smartphone 1 moves a corresponding icon 50 to the home screen 40d. In this case, the second threshold is set to be shorter than the first threshold.

At Step S11, no icon 50 is arranged on the home screen 40d. This indicates that there is no application, at this stage, which is not so used that a corresponding icon 50 should be saved to the home screen 40d.

When a certain time has elapsed without any change in the use status of an application, then, as illustrated at Step S12, the smartphone 1 further increases the transparency of the icon 50b. Furthermore, the smartphone 1 moves the icon 50a from the home screen 40b to the home screen 40d. When the icon 50a is moved, the smartphone 1 may change an arrangement of other icons 50 on the home screen 40b so as to fill the position where the icon 50a is arranged.

When a certain time has further elapsed without any change in the use status of the application, the smartphone 1 moves the icon 50b from the home screen 40b to the home screen 40d. The movement of the icon 50a and the icon 50b in this manner makes it easier for the user to find an icon 50 corresponding to a frequently used application, thus improving the user's operability.

At Step S12, the smartphone 1 adds an Uninstall icon 52 to the home screen 40d together with the movement of the icon 50a. The Uninstall icon 52 is used to perform batch uninstallation of applications whose icons are arranged on the home screen 40d.

Figure 8:
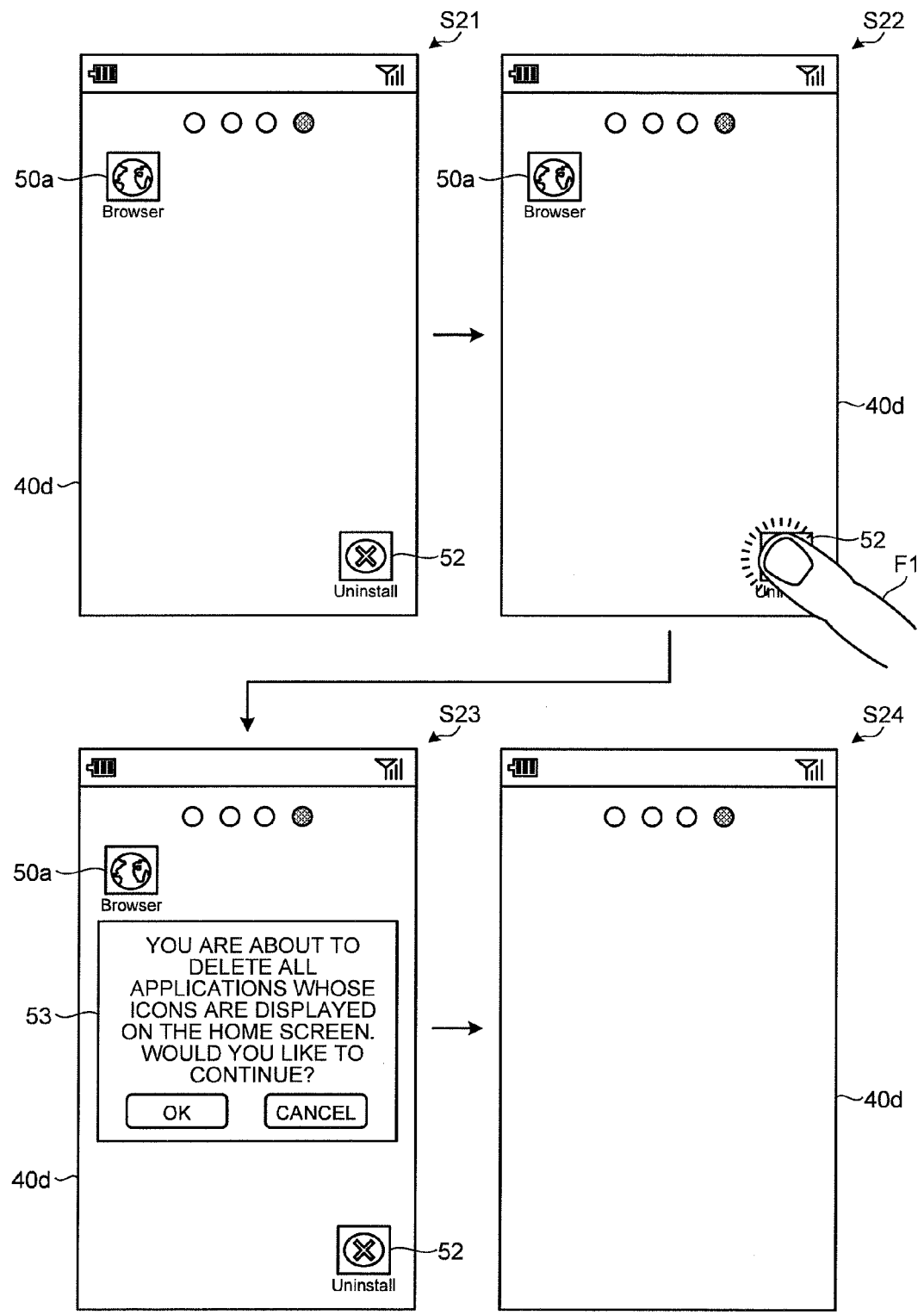
FIG. 8 is a diagram illustrating an example of performing batch uninstallation of applications.

FIG. 8 depicts a process flow for batch uninstallation of applications. At Step S21, similarly to Step S12 in FIG. 7, the icon 50a and the Uninstall icon 52 are arranged on the home screen 40d. As illustrated at Step S22, when detecting a tap on the Uninstall icon 52 with a user's finger F1, then, as illustrated at Step S23, the smartphone 1 displays a dialog 53 on the display 2A. The dialog 53 includes a message indicating that all the applications whose icons are displayed on the home screen are to be uninstalled, OK button, and CANCEL button.

When detecting a tap on the OK button of the dialog 53, the smartphone 1 uninstalls applications corresponding to all the icons 50 arranged on the home screen 40d except for the Uninstall icon 52. Furthermore, the smartphone 1 deletes the Uninstall icon 52 and all the icons 50 corresponding to the uninstalled applications from the home screen 40d. As a result of this, as illustrated at Step S24, no icons 50 appear on the home screen 40d.

When a plurality of icons 50 are saved to the home screen 40d, all the applications corresponding to the icons 50 are uninstalled at a time through operations of the Uninstall icon 52 and the dialog 53. In this way, the smartphone 1 is configured to perform batch uninstallation of less used applications. This enables the space for arrangement of icons on each home screen and the capacity of the storage 9 to be effectively used.

Figure 9:
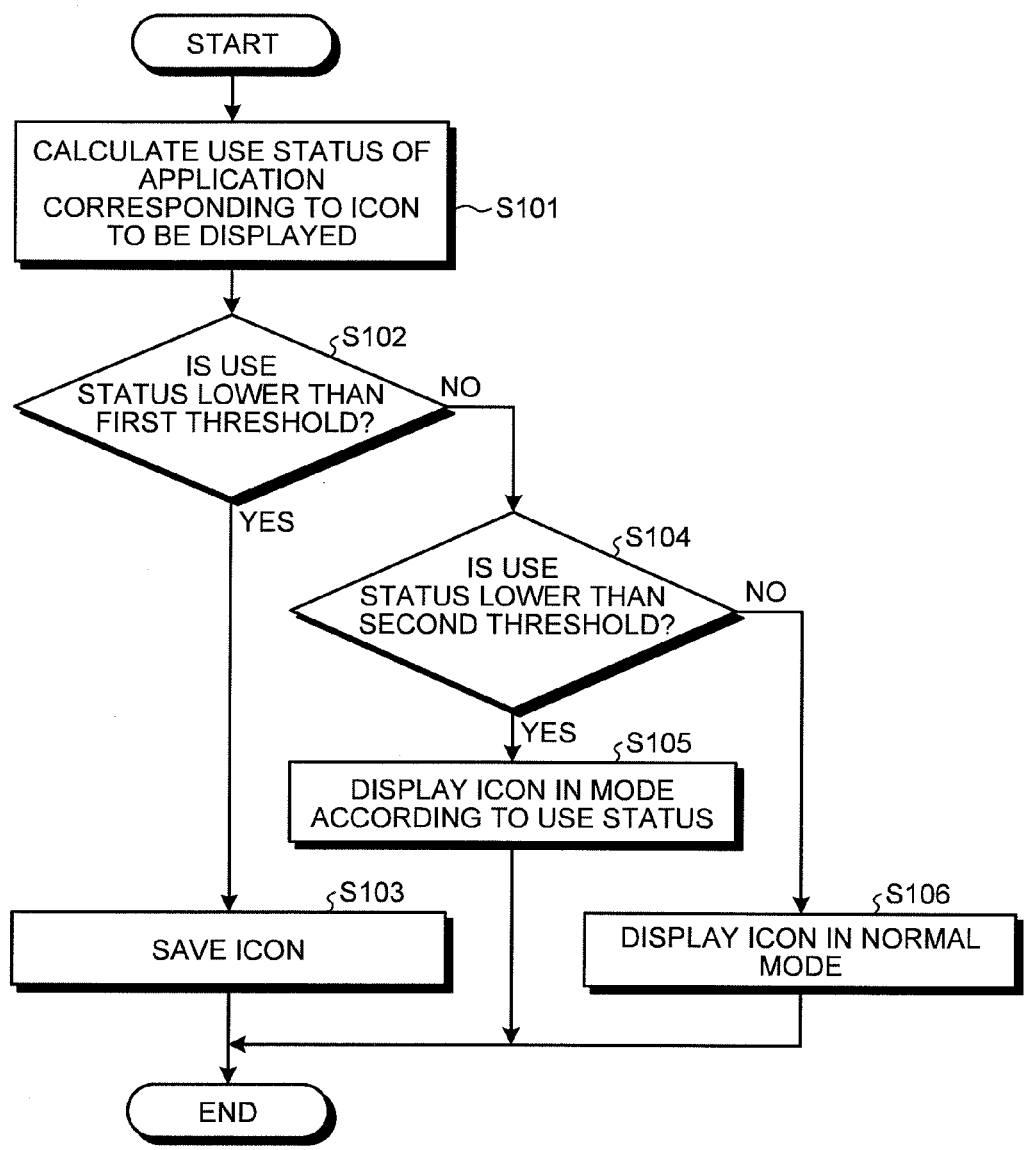
FIG. 9 is a flowchart illustrating a procedure for displaying an icon on the home screen.

An example of a procedure of the control based on the function provided by the control program 9A will be explained below with reference to FIG. 9. FIG. 9 depicts a procedure for displaying an icon on the home screen. The procedure illustrated in FIG. 9 is implemented by the controller 10 executing the control program 9A. The procedure in FIG. 9 is executed for each icon arranged on the home screen 40. The controller 10 may execute another procedure for control of the home screen 40 in parallel to the procedure in FIG. 9.

At Step S101, the controller 10 calculates a use status of an application corresponding to an icon to be displayed. Then at Step S102, the controller 10 determines whether the use status is lower than the first threshold. When the use status is lower than the first threshold (Yes at Step S102), then at Step S103, the controller 10 moves the icon to the home screen for saving. "The use status is lower than the first threshold" means, for example, that the use frequency is less than the first threshold or that the unused period is longer than the first threshold. The home screen for saving is, for example, the home screen 40*d* in the example of FIG. 7.

When the use status is not lower than the first threshold (No at Step S102), then at Step S104, the controller 10 determines whether the use status is lower than the second threshold. When the use status is lower than the second threshold (Yes at Step S104), then at Step S105, the controller 10 displays the icon in a mode according to the use status. For example, the controller 10 increases the transparency of the icon according to the use status. "The use status is lower than the second threshold" means, for example, that the use frequency is less than the second threshold or that the unused period is longer than the second threshold.

When the use status is not lower than the second threshold (No at Step S104), then at Step S106, the controller 10 displays the icon in a normal mode. For example, the controller 10 displays the icon without an increase in transparency.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the transparency of an icon is changed in order to make the icon less conspicuous according to the use status of an application; however, the change in the display mode of an icon according to the use status is not limited thereto. The smartphone 1 may apply any change to at least one of an image, a frame of an image, and text included in an icon according to the use status of an application.

Figure 10:
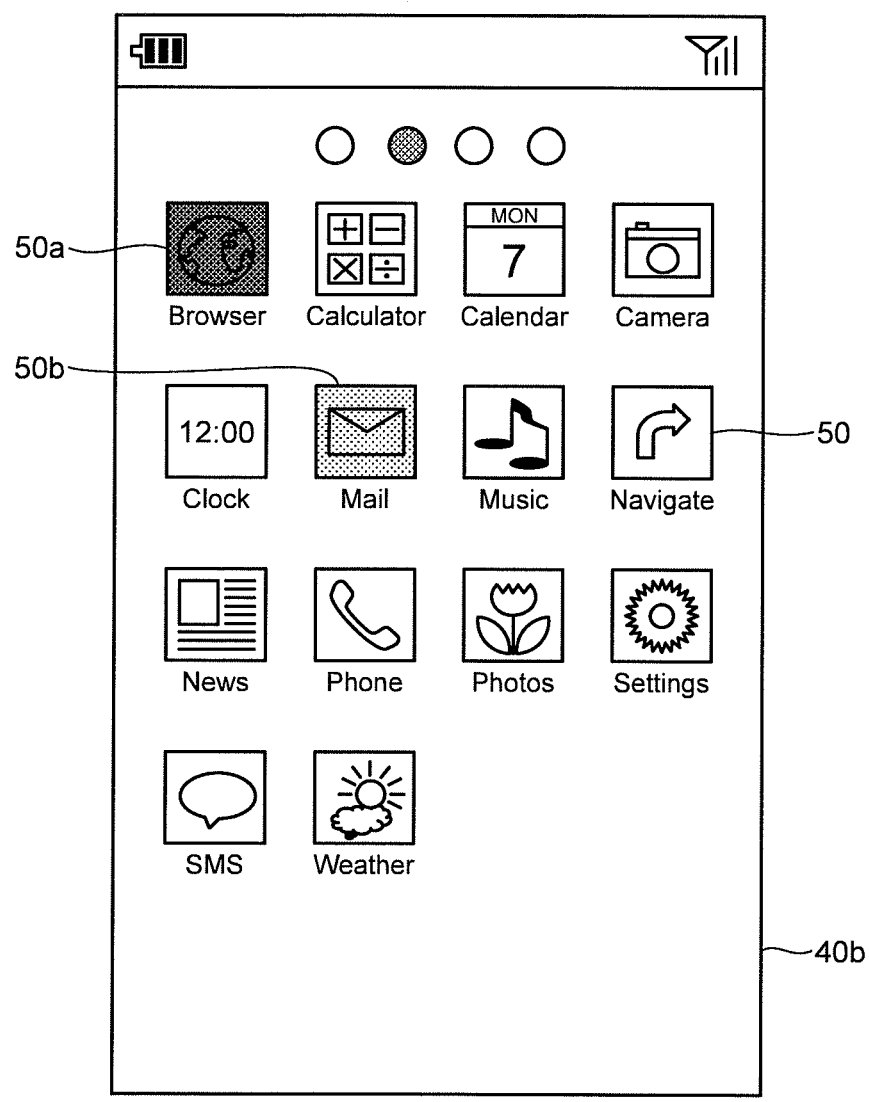
FIG. 10 is a diagram illustrating an example of at least one of brightness and saturation according to the use status of an application.
Figure 11:
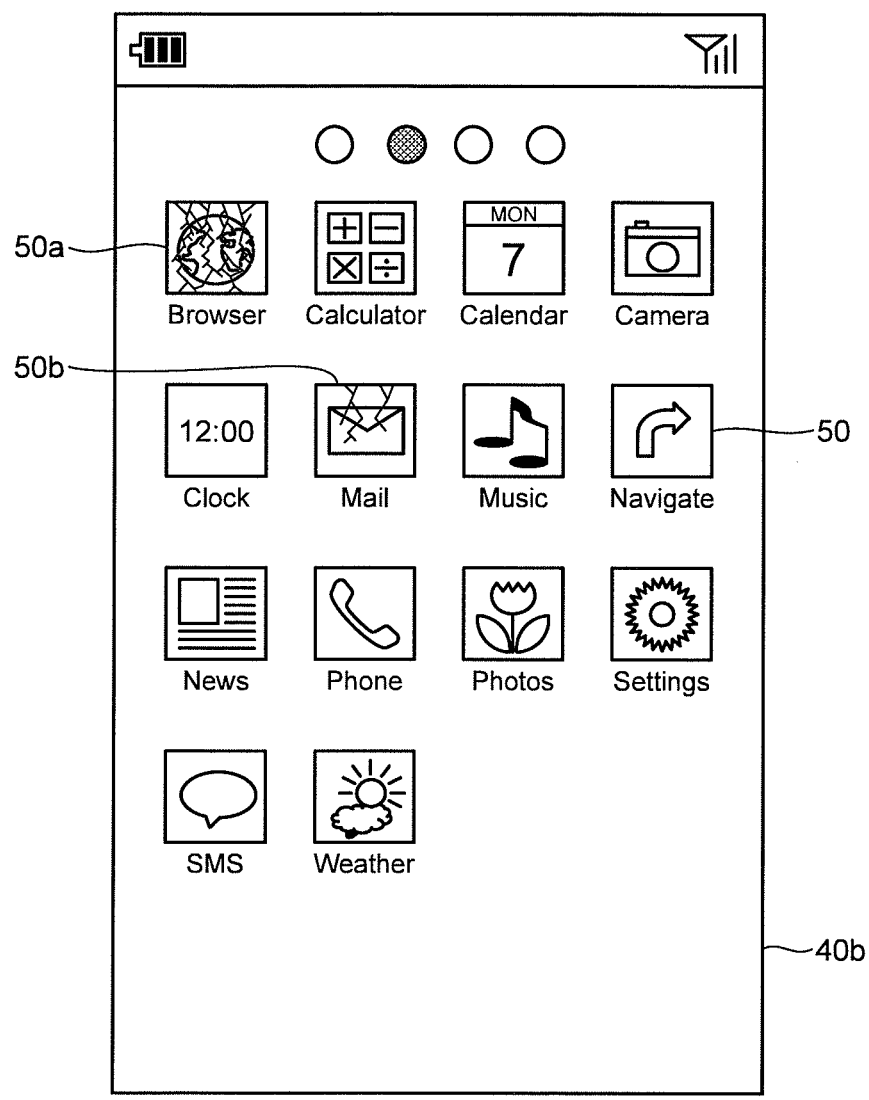
FIG. 11 is a diagram illustrating an example of adding cracks or so to an icon according to the use status of an application.
Figure 12:
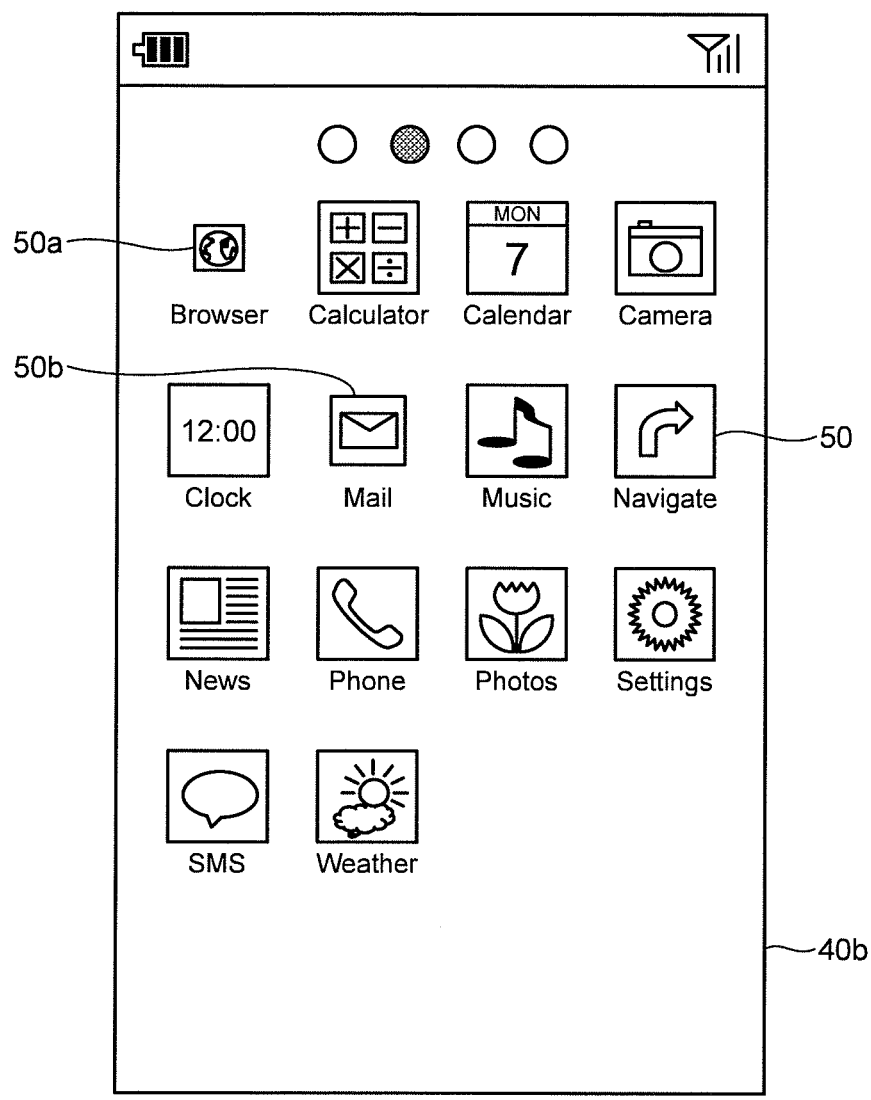
FIG. 12 is a diagram illustrating an example of changing a size of an icon according to the use status of an application.

For example, as illustrated in FIG. 10, the smartphone 1 may change at least one of the brightness and the saturation of icons according to the use status of applications. For example, as illustrated in FIG. 11, the smartphone 1 may apply cracks, dust, rust, or moss or so to icons according to the use status of applications. For example, as illustrated in FIG. 12, the smartphone 1 may change the size of icons according to the use status of applications. The examples illustrated in FIG. 10 to FIG. 12 represent that the mail application 9B corresponding to the icon 50*b* is used less frequently than other icons 50 and the browser application 9C corresponding to the icon 50*a* is used much less frequently than the mail application 9B.

Figure 13:
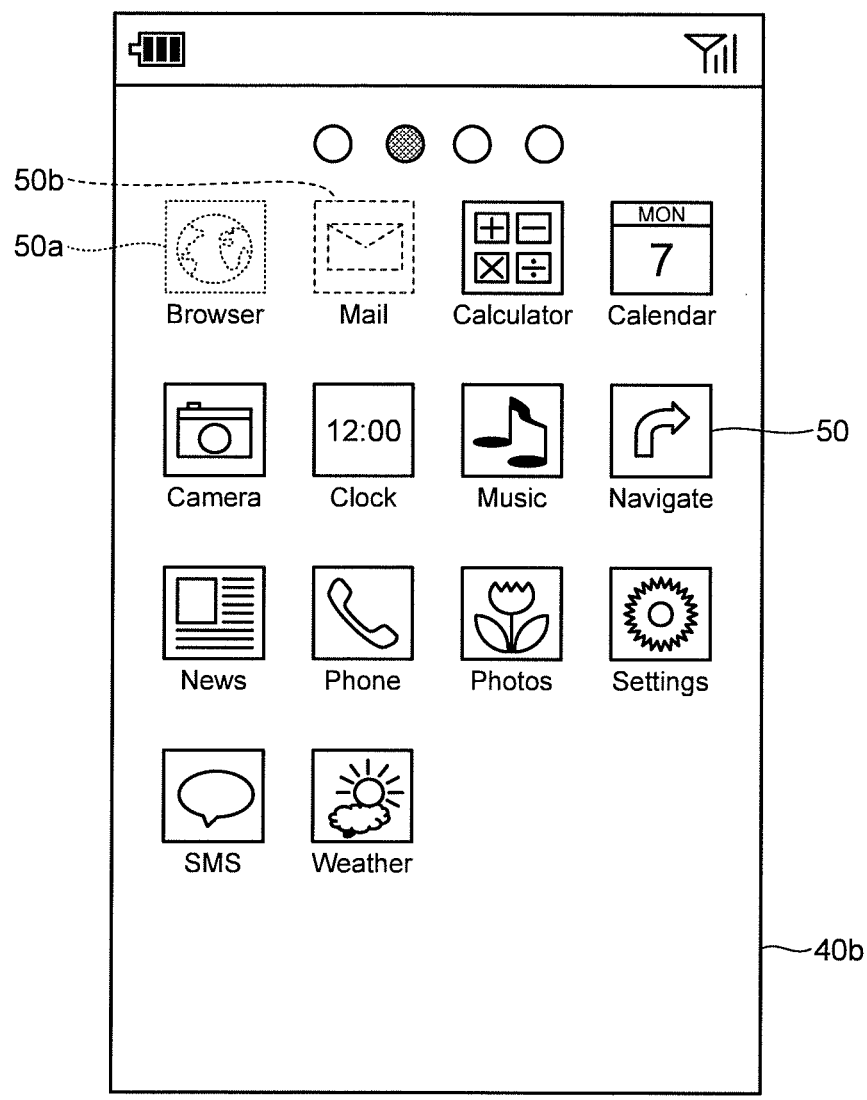
FIG. 13 is a diagram illustrating an example of rearranging icons according to the use status of an application.

In the embodiment, an icon is displayed in an inconspicuous mode according to the use status of an application; however, icons may be rearranged according to the use status of applications. FIG. 13 depicts an example of rearranging icons according to the use status of applications. In the example of FIG. 13, the icon 50*a* corresponding to the least frequently used browser application 9C is displayed at a first position, and the icon 50*b* corresponding to the second least frequently used mail application 9B is displayed at a second position. In the example of FIG. 13, the display mode of icons is changed according to the use status of applications; however, if icons are to be rearranged according to the use status, the display mode of icons does not have to be changed. When icons are to be rearranged according to the use status, an icon corresponding to the least frequently used application may be displayed at the last position.

In the embodiment, an icon corresponding to a hardly used application is saved to the home screen on the far right; however, the icon may be saved to any home screen other than the home screen on the far right. Alternatively, the smartphone 1 may save the icon corresponding to the hardly used application to a folder on the same home screen instead of to other home screen. "Folder" is an object that functions as a container for storing therein one or more icons.

Figure 14:
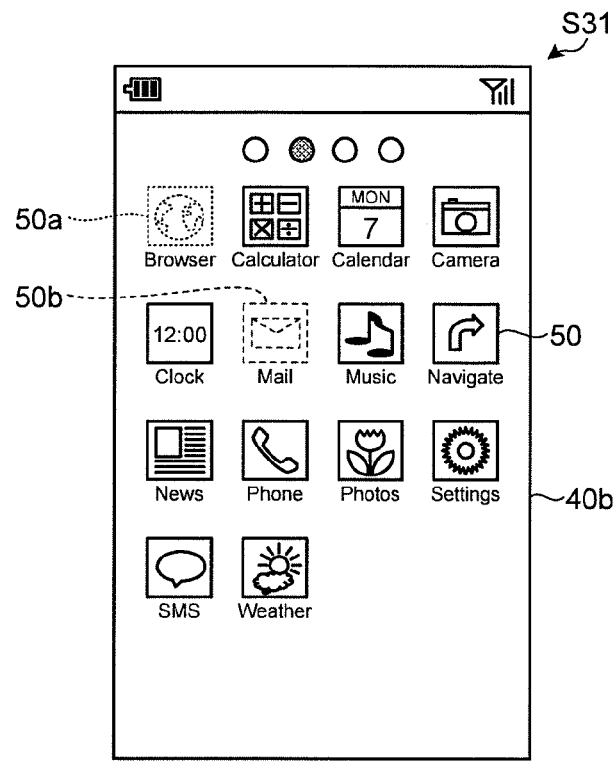
FIG. 14 is a diagram illustrating an example of saving an icon to a folder according to the use status of an application.
Figure 14:
Figure 14:
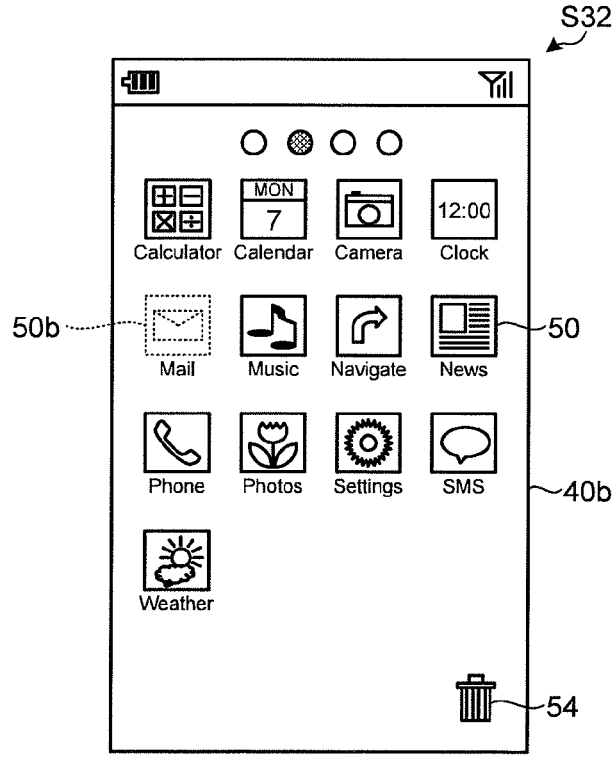
Figure 15:
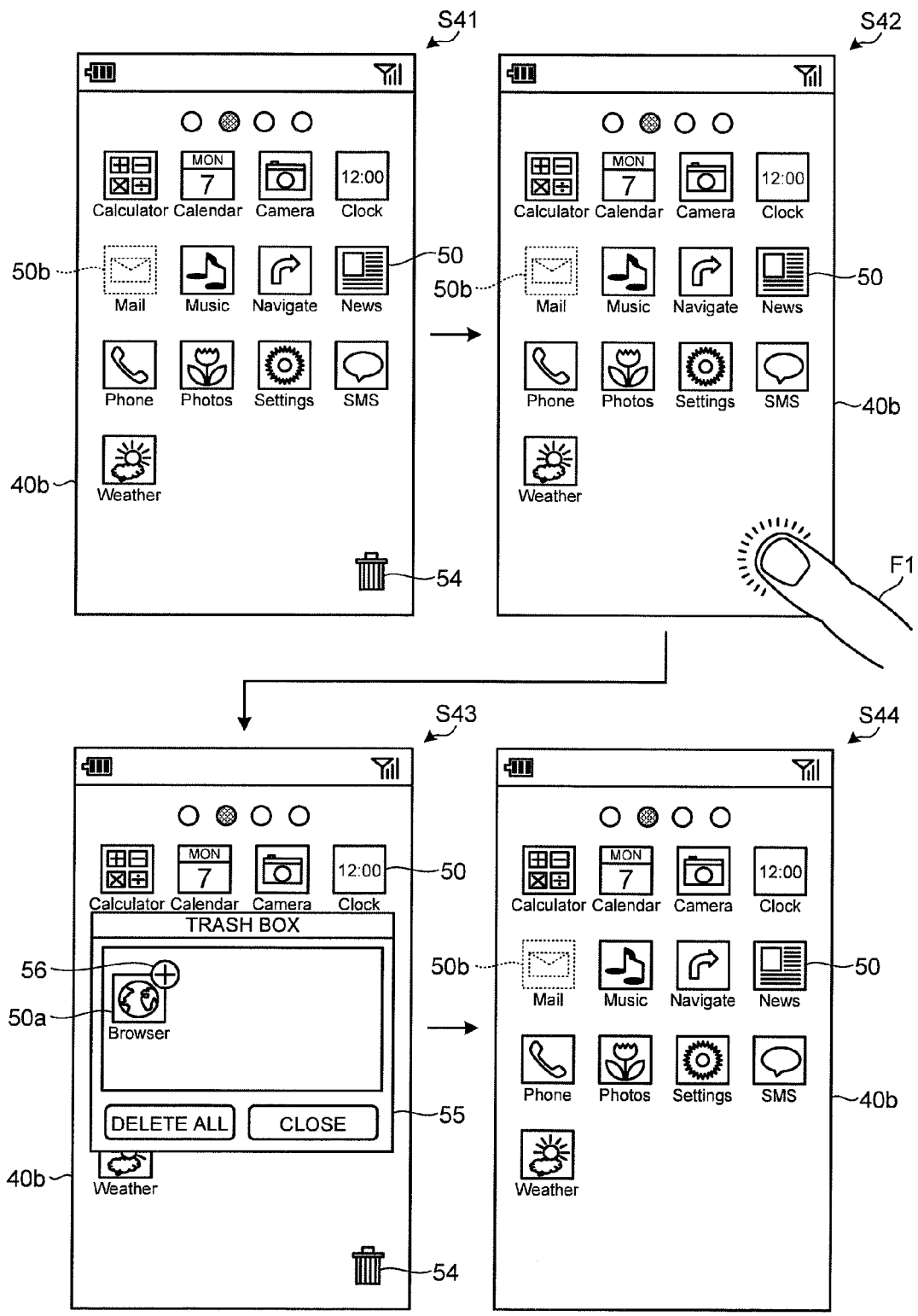
FIG. 15 is a diagram illustrating an example of performing batch uninstallation of applications.

An example of saving an icon to the folder will be explained below with reference to FIG. 14 and FIG. 15. At Step S31 illustrated in FIG. 14, similarly to Step S11 in FIG. 7, the icon 50*b* is displayed on the home screen 40*b* with a transparency that is greater than that of other icons 50, and the icon 50*a* is displayed thereon with a transparency that is further greater than that of the icon 50*b*. In other words, the mail application 9B corresponding to the icon 50*b* is used less frequently than applications corresponding to other icons 50, and the browser application 9C corresponding to the icon 50*a* is used much less frequently than the mail application 9B.

When a certain time has elapsed without any change in the use status of the applications, then, as illustrated at Step S32, the smartphone 1 further increases the transparency of the icon 50*b*. Moreover, the smartphone 1 adds a folder 54 to the home screen 40*b* and stores the icon 50*a* into the folder 54. When the icon 50*a* is to be stored into the folder 54, the smartphone 1 may change the arrangement of the other icons 50 on the home screen 40*b* so as to fill the position where the icon 50*a* is arranged. Although the folder 54 has an appearance like a trash box in FIG. 14, the appearance of the folder 54 is not limited thereto.

When a certain time has further elapsed without any change in the use status of the applications, the smartphone 1 stores the icon 50*b* into the folder 54. The storage of the icon 50*a* and the icon 50*b* into the folder 54 makes it easier for the user to find an icon 50 corresponding to a frequently used application, thus improving the user's operability.

The folder 54 is further used to perform batch uninstallation of applications corresponding to stored icons. FIG. 15 depicts a process flow of batch uninstallation of applications. At Step S41, similarly to Step S32 in FIG. 14, the folder 54 is arranged on the home screen 40*b*. The icon 50*a* is stored in the folder 54.

As illustrated at Step S42, when detecting a tap on the folder 54 with the user's finger F1, then, as illustrated at Step S43, the smartphone 1 displays a dialog 55 on the display 2A. The dialog 55 includes a list of stored icons 50, Delete ALL button, and Close button. Restore button 56 is added to each of the icons 50 displayed in the form of list in the dialog 55. When detecting a tap on the Restore button 56, the smartphone 1 takes the icon 50 corresponding to the tapped Restore button 56 out of the folder 54, and arranges it on the home screen 40b.

When detecting a tap on the Delete ALL button of the dialog 55, the smartphone 1 uninstalls applications corresponding to all the icons 50 stored to the folder 54. Furthermore, as illustrated at Step S44, the smartphone 1 closes the dialog 55 and deletes the folder 54 from the home screen 40b.

Figure 16:
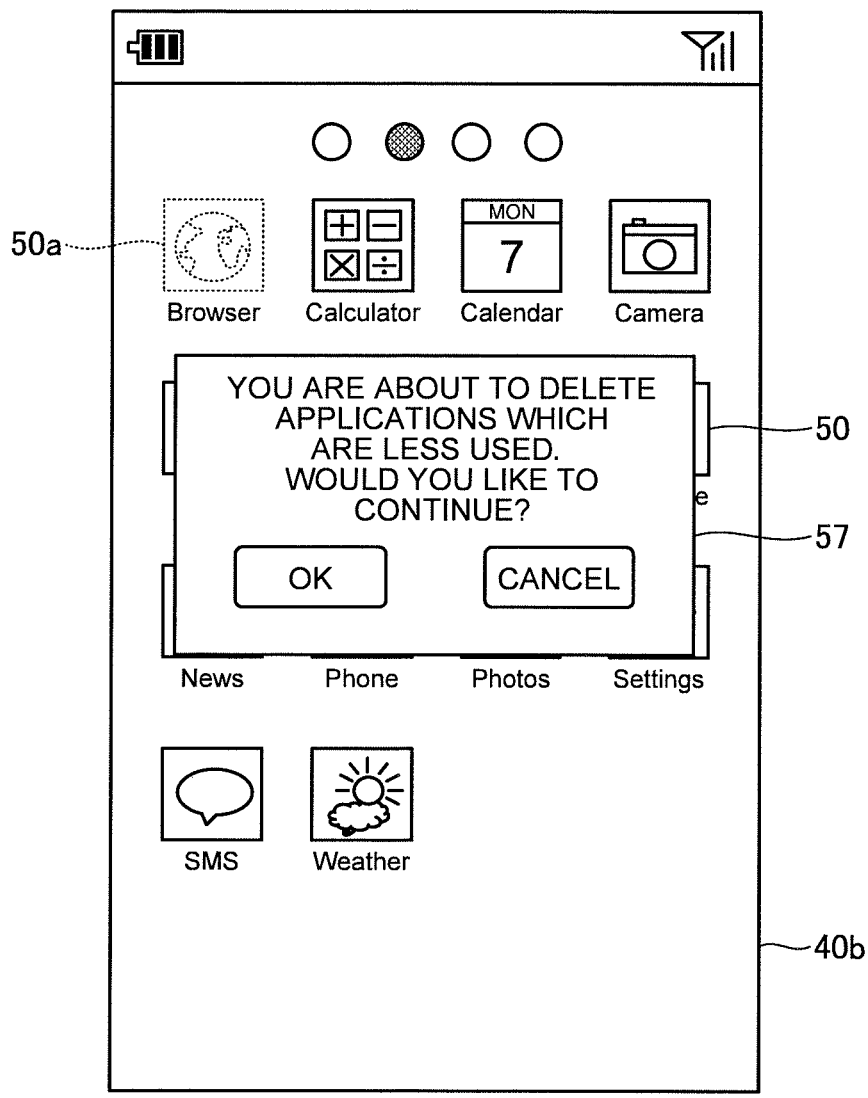
FIG. 16 is a diagram illustrating an example of inquiring of a user for whether to perform batch uninstallation.

In the embodiment, the batch uninstallation of applications is executed by a user's operation as a trigger; however, the trigger of executing the batch uninstallation of applications is not limited thereto. For example, the smartphone 1 may periodically execute batch uninstallation of applications. Alternatively, when the number of icons saved according to the use status increases more than a predetermined number, the smartphone 1 may execute batch uninstallation of applications. For executing batch uninstallation of applications, as illustrated in FIG. 16, the smartphone 1 may display a dialog 57 inquiring of the user for whether to perform batch uninstallation on the display 2A.

In the embodiment, the display mode of an icon is changed so as to make less conspicuous the icon according to the use status of the application; however, the change in the display mode of an icon according to the use status is not limited thereto. The smartphone 1 may change the display mode so as to make conspicuous a frequently used icon. The smartphone 1 may change at least one of brightness and saturation according to the use status of an application. For example, the smartphone 1 may add luster or gross or so to an icon according to the use status of an application. For example, the smartphone 1 may display a large-sized icon according to the use status of an application.

In the embodiment, the smartphone has been explained as an example of the device provided with the display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
a display configured to display a current home screen containing an icon corresponding to an application, wherein the current home screen is a home screen among a plurality of home screens; and
a controller configured to change a display mode of the icon according to a use status of the application corresponding thereto,
wherein the controller is configured to, according to the use status of the corresponding application, automatically move the icon from the current home screen to a rightmost home screen among the plurality of home screens, and
wherein the controller is configured to:
create an uninstall icon on the rightmost home screen when the icon is moved to the rightmost home screen for a first time, and
when a gesture on the uninstall icon is detected, simultaneously uninstall all the applications corresponding to the icons moved to said rightmost home screen in a period from a time at which the uninstall icon is created to a time at which the gesture is detected.

2. The device according to claim 1, wherein the controller is configured to change a display image of the icon as the display mode changes.

3. The device according to claim 1, wherein the controller is configured to automatically move the icon from the current home screen to said rightmost home screen in response to the use status of the corresponding application being lower than a threshold.

4. The device according to claim 1, wherein the controller is configured to change a transparency of the icon according to the use status of the corresponding application.

5. The device according to claim 4, wherein the controller is configured to automatically move the icon from the current home screen to said rightmost home screen in response to the use status of the corresponding application being lower than a first threshold, and the controller is configured to change the transparency of the icon in response to the use status of the corresponding application being between (i) the first threshold and (ii) a second threshold greater than the first threshold.

6. The device according to claim 1, wherein the display is configured to display, in the current home screen, a plurality of icons corresponding to a plurality of applications, and the controller is configured to change an order in which the icons are arranged in the current home screen according to use statuses of the corresponding applications.

7. The device according to claim 1, wherein the controller is configured to automatically move the icon from the current home screen to said rightmost home screen based on a comparison of the use status of the corresponding application with a first threshold, and the controller is configured to change a display image of the icon based on a comparison of the use status of the corresponding application with a second threshold different from the first threshold.

8. The device according to claim 1, wherein the current home screen and said rightmost home screen are different home screens.

9. The device according to claim 1, wherein the current home screen and said rightmost home screen are different home screens which are switchable from one to another in response to one or more swipe operations.

10. The device according to claim 1, wherein the controller is configured to, in response to a gesture on the icon in said rightmost home screen, execute the application corresponding to the icon.

11. The device according to claim 1, wherein the controller is configured to, at a predetermined time interval, uninstall all the applications corresponding to the icons moved to said rightmost home screen.

12. The device according to claim 1, wherein
a number of the icons displayed on the current home screen is reduced by a number of icons moved to said rightmost home screen.

13. The device according to claim 1, wherein
the display mode of the moved icon in the rightmost home screen returns to a state before said display mode was changed.

14. The device according to claim 1, wherein
the controller is configured to, according to the use status of the corresponding application, automatically move the icon from the current home screen to said rightmost home screen.

15. A method for controlling a device having a display, the method comprising:
   displaying, on the display, a current home screen containing an icon corresponding to an application, wherein the current home screen is a home screen among a plurality of home screens;
   changing a display mode of the icon according to a use status of the application corresponding thereto;
   according to the use status of the corresponding application, automatically moving the icon from the current home screen to a rightmost home screen among the plurality of home screens;
   creating an uninstall icon on the rightmost home screen when the icon is moved to the rightmost home screen for a first time; and
   when a gesture on the uninstall icon is detected, simultaneously uninstalling all the applications corresponding to the icons moved to said rightmost home screen in a period from a time at which the uninstall icon is created to a time at which the gesture is detected.

16. A non-transitory storage medium that stores a program for causing, when executed by a device having a display, the device to execute:
   displaying, on the display, a current home screen containing an icon corresponding to an application, wherein the current home screen is a home screen among a plurality of home screens;
   changing a display mode of the icon according to a use status of the application corresponding thereto;
   according to the use status of the corresponding application, automatically moving the icon from the current home screen to a rightmost home screen among the plurality of home screens;
   creating an uninstall icon on the rightmost home screen when the icon is moved to the rightmost home screen for a first time; and
   when a gesture on the uninstall icon is detected, simultaneously uninstalling all the applications corresponding to the icons moved to said rightmost home screen in a period from a time at which the uninstall icon is created to a time at which the gesture is detected.

* * * * *